United States Patent [19]
Hatcher

[11] 3,841,522
[45] Oct. 15, 1974

[54] AGRICULTURAL PLANTER SEED PLATE
[75] Inventor: John C. Hatcher, Charlotte, N.C.
[73] Assignee: Cole Manufacturing Company, Charlotte, N.C.
[22] Filed: Mar. 16, 1973
[21] Appl. No.: 342,181

[52] U.S. Cl. ............................................. 221/265
[51] Int. Cl. .......................................... B65g 65/48
[58] Field of Search ...... 221/265, 167, 169; 111/34, 111/77; 222/370

[56] References Cited
UNITED STATES PATENTS
630,452   8/1899   Dooley ........................... 221/265 X
1,823,995 9/1931   Streby ............................ 221/169 X
2,054,552 9/1936   Wakeham ......................... 221/265
3,117,540 1/1964   Shader et al. ........................ 111/34

Primary Examiner—Stanley H. Tollberg
Attorney, Agent, or Firm—Parrott, Bell, Seltzer, Park & Gibson

[57] ABSTRACT

An agricultural planting method and seed plate in which a plurality of circumferentially spaced apart, radially extending fins around the periphery of the plate define seed cells and are configured in a particular manner so as to aid reception in the cells of predetermined quantities of seed in predetermined orientations.

10 Claims, 6 Drawing Figures

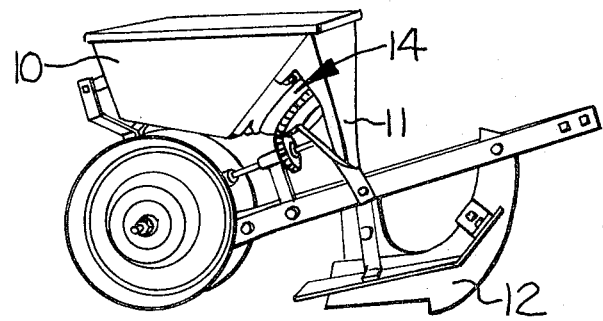
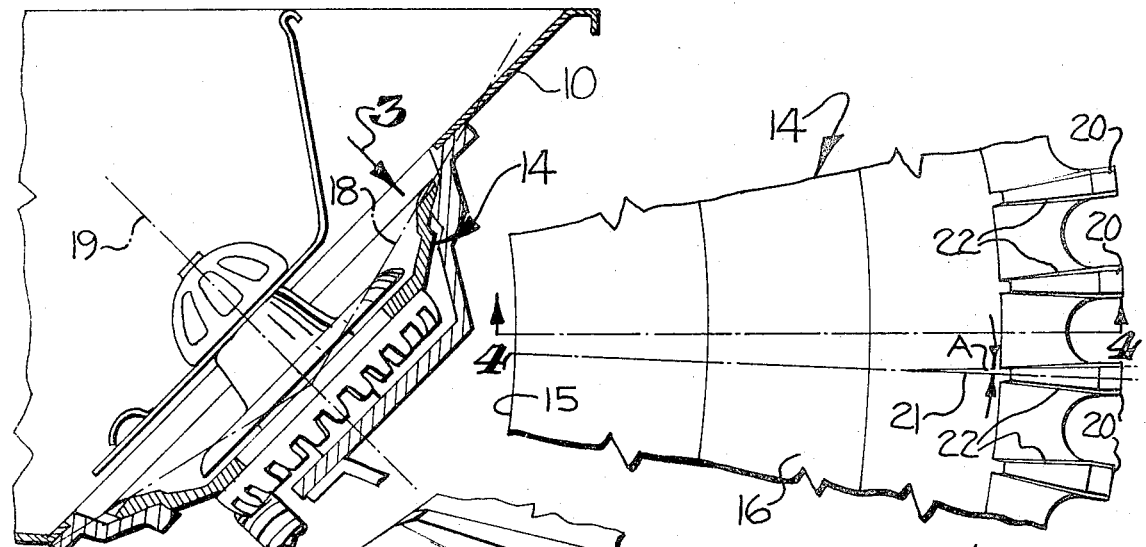
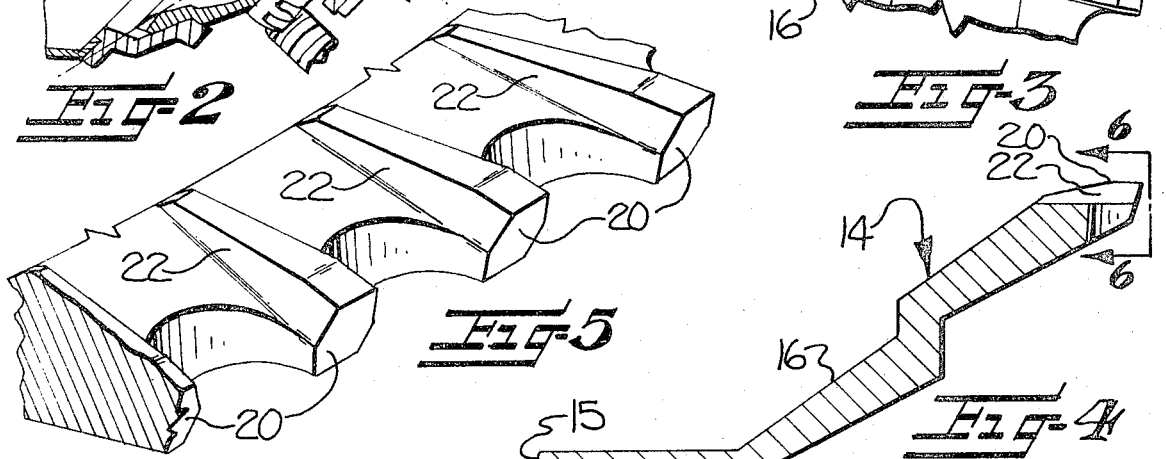
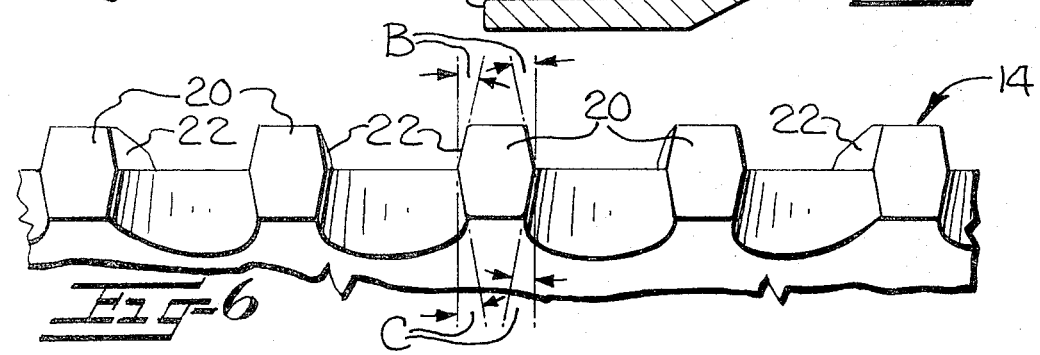

AGRICULTURAL PLANTER SEED PLATE

Many prior agricultural planters have employed seed plates for the selection and discharge of measured quantities of seed to be planted. While long usage of such seed plates has led to development of many arrangements which have been employed satisfactorily, certain common difficulties continue to be encountered.

First, consistently accurate selection and discharge of seed to be planted is often prohibited by bridging or jamming of seed in the seed cells of the seed plate. Further, correct discharge is precluded, on occasion, by incorrect mounting of an asymmetrical seed plate which is designed and constructed for rotation in one direction only. When such an asymmetrical seed plate is incorrectly mounted and is driven in rotation counter to the intended direction, the desired selection and discharge of seed does not and cannot occur. This latter problem is particularly acute with planters of the type having duplex seed hoppers from which two seed plates select and discharge seed and in which the interchange of seed plates is conceivable.

The present invention has as an object the avoidance of the difficulties and deficiencies briefly reviewed hereinabove, through the provision of a seed plate which is symmetrically constructed and is arranged so as to aid reception of seed in the seed cells defined thereby. In accomplishing this object of the present invention, seed cells are defined about the periphery of a seed plate by a circumferential series of symmetrical fins extending around the periphery thereof. The fins each have side walls, with the side walls of adjacent pairs of the fins converging toward the circumference of the seed plate at an angle of about 10° so as to aid the selection and reception in the cells of the predetermined quantities of seed.

In accordance with a further object of this invention, selection and release of predetermined quantities of seed is aided by double convergence of the side walls of adjacent pairs of the fins which define the seed cells. By such double convergence, entry of the seed into the seed cell is guided in one direction of convergence while release of selected seeds from the cell, for discharge thereof from the planter, is aided by the second convergence, all as more particularly pointed out hereinafter.

Some of the objects of the invention having been stated, other objects will appear as the description proceeds, when taken in connection with the accompanying drawings, in which FIG. 1 is a perspective view of an agricultural planter incorporating the seed plate of the present invention;

FIG. 2 is an enlarged elevation view, partly in section, through a portion of the agricultural planter of FIG. 1;

FIG. 3 is a plan view of a sector of the seed plate of the present invention;

FIG. 4 is an elevation view, in section, through the seed plate of FIG. 3, taken along the line 4—4 in that figure;

FIG. 5 is a perspective view of some of the fins around the periphery of the seed plate of FIGS. 3 and 4;

FIG. 6 is an enlarged elevation view, taken generally as indicated by the line 6—6 in FIG. 4, of the fins around the periphery of the seed plate of FIGS. 3–5.

The seed plate of this invention will be described hereafter with particular reference to an agricultural planter environment of the form illustrated. At the outset, however, it is to be understood that the illustration and description of this invention in connection with a particular planter environment is given as a general teaching of the best mode of applying the invention, and not as a limitation upon the invention. Accordingly, the illustration and disclosure are to be taken as a broad teaching of the present invention, which is contemplated as having wide utility.

The agricultural planter generally illustrated in FIG. 1 is of the type including a seed hopper generally indicated at 10 and a seed chute 11 through which seed to be planted is discharged to reach a furrow opened by a sword 12 or other opening device. The selection and discharge of seed to be planted is accomplished through the rotation of a seed plate generally indicated at 14 and the cooperation thereof with other components of the planter in a manner which is generally known from prior disclosures.

Seed plate 14, in accordance with this invention, comprises an annular member which extends from a radial inner termination which defines a mounting opening 15 to a radial outer termination at the periphery thereof. Preferably, the annular member comprises a truncated, generally conical body 16 of predetermined thickness. The body 16 may be said to describe a central principal plane 18, illustrated in FIG. 2 as passing from the intersection of a central axis 19 with the plane of the mounting opening 15 through the periphery of the annular member. As so defined, the principal plane 18 of the body 16 describes a cone.

Around the periphery of the body 16 are a plurality of circumferentially spaced apart, radially extending fin means 20. Each of the fin means 20 is symmetrical about a radial line extending from the center of the body 16 (such as the radial line 21 in FIG. 4) and has side walls 22. The side walls 22 of adjacent pairs of fin means 20 define therebetween seed cells about the circumference of the seed plate 14, for selecting and discharging seed to be planted.

The symmetry of the fin means 20 about radial lines extending from the center of the seed plate 14 is of significance, in this invention, in assuring proper selection and discharge of seed irrespective of the direction of rotation of the seed plate. Thus, the seed plate is readily interchangeable for cooperating with planter arrangements which rotate the seed plates in differing directions or hands, such as divided hopper, multiple hopper and other such arrangements.

In accordance with important features of this invention, the side walls 22 of the fin means 20 are directed in predetermined angular relations so as to aid reception in the seed cells of predetermined quantities of seed and release from the seed cells of the selected seed. More particularly, each of the side walls 22 which together define an individual seed cell extends at an angle of at least about 10° to a radius. This angle is indicated as the angle A in FIG. 3.

While the side walls 22 of the adjacent pairs of fin means 20 thus converge towards the circumference of the seed plate 14, it is desirable, in accordance with this invention, that the convergence of the side walls 22 be multiple. In particular, it is desirable that the fin means 20 extend on both faces of the body 16 and that the side walls 22 converge both towards the circumference and towards the principal plane 18 on both faces of the seed plate 14. Convergence of the side walls 22 towards the principal plane 18 is illustrated in FIG. 6 as shown by the angle B related to the surface of the seed plate visible in FIG. 3 and the angle C related to the undersurface which is concealed from view in FIG. 3.

By this multiple convergence, a constricted throat area for the seed cells is defined, which provides a least area through which seed to be selected and discharged must pass. Convergence towards the throat area assures ease in selecting seed to be discharged, with avoidance of jamming or clogging of seed in the cells. From the undersurface, the convergence assures ready dropping or release of seed selected in the cell, thereby assuring reliability of planting desired quantities of the seed at desired intervals.

The construction of a seed plate 14 in accordance with this invention provides particular advantages in the planting of seeds which have an elongate, rounded end or torpedo shape. Examples of such seeds include peanuts and acid delinted cotton, with further examples readily coming to the mind of persons familiar with the planting of agricultural seed. Such seeds have, in the past, presented certain difficulties in achieving desired accuracy of planting, which has led in part to the use of multiple hopper planters having multiple seed plates. In distinction to prior seed plates, the seed plate of this invention can select seed in a lengthwise orientation. That is, seed are guided into the cells around the periphery of the seed plate with the lengthwise dimension of the elongate seed directed generally radially of the seed plate.

Such selection of individual seed to be planted by guiding the seed longitudinally into one of a series of rotating, elongate and outwardly converging seed cells accommodates a significantly increased number of cells in a single plate and thereby permits single hopper operation in the planting of seeds such as peanuts and acid delinted cotton while also assuring operation of the seed plate within the desirable rotational speed ranges. Experience has shown that seed plates should rotate within particular speed ranges, as operation at too high a rotational speed due to a desired high density planting will result in seed being carried over or partially dropped and cut, while operation at too low a rotational speed will result in excessive vibration and poor lifting of selected seed.

Such individual selection of seed to be planted, accomplished by dipping an individual seed cell into a loose bed of seed to be planted and passing the cell through the bed to underlie the seed to be selected, will accomplish more accurate determination of plant spacings and densities. This is particularly advantageous where a range of varieties of seed may be considered by farmers using this method of planting, inasmuch as individual farmers may be expected to have individual preferences as to the varieties of seed chosen and the desired densities of planting. Due to the accomplishment of a significant variation in the number of cells in a seed plate constructed in accordance with this invention and a wider range of rotational speeds at which satisfactory operation is achieved, the seed plate of this invention reduces the number of different plates which must be purchased by a farmer or kept in inventory by a dealer in order to accommodate the possible range of seeds to be planted.

In the drawings and specification, there has been set forth a preferred embodiment of the invention, and although specific terms are employed, they are used in a generic and descriptive sense only and not for purposes of limitation.

That which is claimed is:

1. A seed plate for an agricultural planter and which facilitates selection and discharge of seed to be planted, the plate comprising an annular member having a plurality of circumferentially spaced apart, radially extending fin means around the periphery thereof, each of said fin means being symmetrical about a radial line extending from the center of said member and having sidewalls, opposing sidewalls of adjacent fin means defining therebetween seed cells about the circumference of said member and each pair of opposing sidewalls converging toward said circumference at an included angle of about 20° to a radius so as to aid reception in the seed cells of predetermined quantities of seed.

2. A seed plate according to claim 1 wherein said annular member comprises a truncated, generally conical body of predetermined thickness defining a central opening of predetermined diameter and adapted for receipt by a planter.

3. A seed plate according to claim 1 wherein said fin means project radially outwardly of said annular member so as to define a toothed circumference about said member and said adjacent fin means define said seed cells for receiving seed from one face of said member and for discharging seed from the other face of said member.

4. A seed plate according to claim 1 wherein said member has a principal plane, said fin means project radially outwardly of said member so as to define a toothed circumference about said member, and said opposing sidewalls of adjacent fin means converge toward said plane from both faces of said member for facilitating free receipt of seed from one face of said member and free discharge of seed toward the other face of said member.

5. A seed plate according to claim 4 wherein said principal plane describes a cone.

6. A seed plate according to claim 4 wherein said fin means extends on both faces of said member and said opposing side-walls converge toward said principal plane and toward said circumference on both faces of said member.

7. In a method of planting elongate, rounded end shaped agricultural seed such as peanuts, acid delinted cotton and the like, an improvement in the dispensing of seed to be planted comprising the steps of rotating a seed plate through a loose bed of seed to be planted, selecting individual seed to be planted by guiding the seed longitudinally of the seed axis into one of a series of rotating, elongate and outwardly converging seed cells and by positioning the seed with the seed axis extending generally radially of the seed plate, lifting the selected seed from the bed by the rotation of the seed plate, and dropping the selected seed from the one cell at a location above the bed.

8. A method according to claim 7 wherein the rotating of the seed plate describes with an individual seed cell a conical path about an inclined central axis.

9. A method according to claim 7 wherein the rotating of the seed plate and selecting of seed include dipping an individual seed cell into the bed and passing the cell through the bed to underlie seed to be selected whereby gravity aids in guiding seed into the cell.

10. A method according to claim 7 wherein the dropping of the seed includes passing the cell over a chute and dropping the seed from the cell into the chute whereby gravity aids in discharging seed from the cell.

* * * * *